(12) United States Patent
Zhang et al.

(10) Patent No.: US 11,809,046 B1
(45) Date of Patent: Nov. 7, 2023

(54) DISPLAY PANEL, MANUFACTURING METHOD OF DISPLAY PANEL, AND DISPLAY APPARATUS

(71) Applicant: HKC CORPORATION LIMITED, Shenzhen (CN)

(72) Inventors: Jianying Zhang, Guangdong (CN); Rongrong Li, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/083,384

(22) Filed: Dec. 16, 2022

(30) Foreign Application Priority Data

May 18, 2022 (CN) .......................... 202210538799.4

(51) Int. Cl.
  *G02F 1/1339* (2006.01)
  *G02F 1/1333* (2006.01)
  *G02F 1/1335* (2006.01)
  *G02F 1/1343* (2006.01)

(52) U.S. Cl.
  CPC ...... *G02F 1/1339* (2013.01); *G02F 1/133357* (2021.01); *G02F 1/133512* (2013.01); *G02F 1/134309* (2013.01)

(58) Field of Classification Search
  None
  See application file for complete search history.

(56) References Cited

U.S. PATENT DOCUMENTS

| | | | |
|---|---|---|---|
| 2017/0205648 A1* | 7/2017 | Xie | ..................... G02F 1/13439 |
| 2017/0212373 A1* | 7/2017 | Sai | ..................... H10N 30/206 |

FOREIGN PATENT DOCUMENTS

| | | |
|---|---|---|
| CN | 103913897 A | 7/2014 |
| CN | 104298012 A | 1/2015 |
| CN | 105629592 A | 6/2016 |
| CN | 105652528 A | 6/2016 |
| CN | 114200721 A | 3/2022 |
| JP | H02212816 A | 8/1990 |

OTHER PUBLICATIONS

First Office Action issued in corresponding CN Application No. CN202210538799.4, dated Jul. 18, 2022, pp. 1-7, Beijing, China.

* cited by examiner

*Primary Examiner* — Thanh Nhan P Nguyen
(74) *Attorney, Agent, or Firm* — HAUPTMAN HAM, LLP

(57) ABSTRACT

A display panel, a manufacturing method of the display panel, and a display apparatus with the display panel are provided in the disclosure. The display panel includes a first substrate assembly, a second substrate assembly, a sealing frame assembly located between the first substrate assembly and the second substrate assembly. The sealing frame assembly includes at least one first electrode, at least one second electrode, and a sealing frame adhesive layer located between the at least one first electrode and the at least one second electrode. Particulate media are disposed in the sealing frame adhesive layer. The at least one first electrode is disposed at one side of the sealing frame adhesive layer facing the first substrate assembly, and the at least one second electrode is disposed at one side of the sealing frame adhesive layer facing the second substrate assembly.

11 Claims, 8 Drawing Sheets

```
┌─────────────────────────────────────────────────┐
│ PROVIDE A FIRST SUBSTRATE AND FORM A LIGHT-SHIELDING │
│ LAYER AND A PLANARIZATION LAYER SEQUENTIALLY ON THE  │─── S310
│ FIRST SUBSTRATE, TO FORM A FIRST SUBSTRATE ASSEMBLY  │
└─────────────────────────────────────────────────┘
                         │
                         ▼
┌─────────────────────────────────────────────────┐
│ PROVIDE A SECOND SUBSTRATE AND FORM A METAL LAYER │
│ AND AN INSULATING LAYER SEQUENTIALLY ON THE SECOND │─── S320
│  SUBSTRATE, TO FORM A SECOND SUBSTRATE ASSEMBLY   │
└─────────────────────────────────────────────────┘
                         │
                         ▼
┌─────────────────────────────────────────────────┐
│  MANUFACTURE A SEALING FRAME ASSEMBLY BETWEEN THE  │
│    FIRST SUBSTRATE ASSEMBLY AND THE SECOND SUBSTRATE│
│  ASSEMBLY TO FORM THE DISPLAY PANEL, WHERE THE SEALING│
│  FRAME ASSEMBLY COMPRISES A FIRST ELECTRODE, A SEALING│
│   FRAME ADHESIVE LAYER, AND A SECOND ELECTRODE THAT │─── S330
│    ARE STACKED SEQUENTIALLY, PARTICULATE MEDIA ARE  │
│  DISPOSED IN THE SEALING FRAME ADHESIVE LAYER, AND THE│
│   PARTICULATE MEDIA ARE DEFLECTED OR EXPANDED OR   │
│       CONTRACTED UNDER ACTION OF DIFFERENT PRESET  │
│   ELECTRICAL FIELDS DEFINED BETWEEN THE FIRST ELECTRODE│
│   AND THE SECOND ELECTRODE TO ADJUST A THICKNESS OF THE│
│            SEALING FRAME ADHESIVE LAYER            │
└─────────────────────────────────────────────────┘
                         │
                         ▼
┌─────────────────────────────────────────────────┐
│         CURE THE SEALING FRAME ADHESIVE LAYER     │─── S340
└─────────────────────────────────────────────────┘
```

FIG. 10

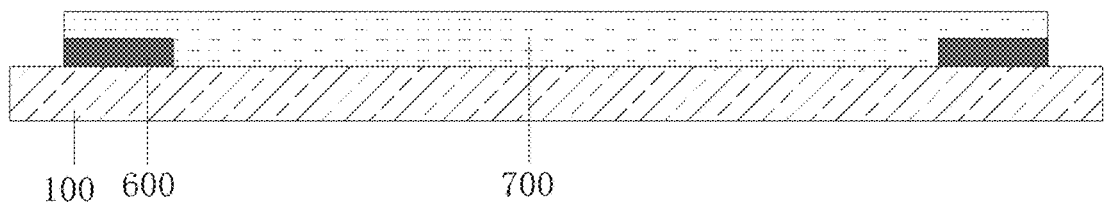

```
┌─────────────────────────────────────────────┐
│ FORM THE FIRST ELECTRODE AND A FIRST        │
│ INSULATING SEALING-FRAME-LAYER ON A         │
│ SURFACE OF THE PLANARIZATION LAYER AWAY     │──── S331
│ FROM THE LIGHT-SHIELDING LAYER, WHERE THE   │
│ FIRST ELECTRODE IS DISPOSED ON AN OUTER     │
│ SIDE SURFACE OF THE FIRST INSULATING        │
│ SEALING-FRAME-LAYER                         │
└─────────────────────────────────────────────┘
                      │
                      ▼
┌─────────────────────────────────────────────┐
│ FORM THE SECOND ELECTRODE AND A SECOND      │
│ INSULATING SEALING-FRAME-LAYER ON A SIDE    │
│ SURFACE OF THE INSULATING LAYER AWAY FROM   │──── S332
│ THE METAL LAYER, WHERE THE SECOND ELECTRODE │
│ IS DISPOSED ON AN OUTER SIDE SURFACE OF THE │
│ SECOND INSULATING SEALING-FRAME-LAYER       │
└─────────────────────────────────────────────┘
                      │
                      ▼
┌─────────────────────────────────────────────┐
│ COAT THE SEALING FRAME ADHESIVE LAYER ON A  │
│ SURFACE OF THE FIRST ELECTRODE AWAY FROM    │
│ THE PLANARIZATION LAYER AND/OR A SURFACE OF │
│ THE SECOND ELECTRODE AWAY FROM THE          │──── S333
│ INSULATING LAYER, WHERE THE PARTICULATE     │
│ MEDIA ARE DISPOSED IN THE SEALING FRAME     │
│ ADHESIVE LAYER                              │
└─────────────────────────────────────────────┘
                      │
                      ▼
┌─────────────────────────────────────────────┐
│ ALIGN THE FIRST ELECTRODE AND THE SECOND    │
│ ELECTRODE AND BOND THE FIRST ELECTRODE TO   │
│ THE SECOND ELECTRODE WITH THE SEALING FRAME │──── S334
│ ADHESIVE LAYER, TO FORM THE DISPLAY PANEL   │
└─────────────────────────────────────────────┘
```

FIG. 13

DISPLAY PANEL, MANUFACTURING METHOD OF DISPLAY PANEL, AND DISPLAY APPARATUS

CROSS-REFERENCE TO RELATED APPLICATIONS

This application claims priority under 35 U.S.C. § 119(a) to Chinese Patent Application No. 202210538799.4, filed May 18, 2022, the entire disclosure of which is incorporated herein by reference.

TECHNICAL FIELD

This disclosure relates to the field of display technology, and more particularly to a display panel, a manufacturing method of the display panel, and a display apparatus with the display panel.

BACKGROUND

Liquid Crystal Displays (LCD) are increasingly important in life and work of people, and are widely applied because of advantages thereof such as thin bodies, low power consumption, and low prices. Generally, an LCD includes a liquid-crystal display panel and a back-light module. The liquid-crystal display panel defines a display region and a non-display region, where spacer columns functioning as supports are distributed in the display region, and supporting and sealing in the non-display region are implemented by a sealing frame adhesive.

However, in a processing of manufacturing the liquid-crystal display panel, a height of the sealing frame adhesive is usually unmatched with a height of the spacer column, which causes deformation of a glass substrate of the liquid-crystal display panel, and further leads to inconsistency of liquid crystal heights at different positions in the display region, resulting in display unevenness.

Therefore, how to solve a problem of display unevenness due to the mismatch between the height of the sealing frame adhesive and the height of the spacer column is an urgent problem to-be-solved.

SUMMARY

In a first aspect, a display panel is provided in implementations of the disclosure. The display panel includes a first substrate assembly, a second substrate assembly, a liquid crystal layer located between the first substrate assembly and the second substrate assembly, and a sealing frame assembly located around a periphery of the liquid crystal layer. The sealing frame assembly is disposed between the first substrate assembly and the second substrate assembly. The sealing frame assembly includes at least one first electrode, at least one second electrode, and a sealing frame adhesive layer located between the at least one first electrode and the at least one second electrode. Particulate media are disposed in the sealing frame adhesive layer. The at least one first electrode is disposed at one side of the sealing frame adhesive layer facing the first substrate assembly, and the at least one second electrode is disposed at one side of the sealing frame adhesive layer facing the second substrate assembly. The at least one first electrode and the at least one second electrode are used to define different preset electrical fields, and the particulate media are deflected or expanded or contracted under action of the different preset electrical fields to adjust a thickness of the sealing frame adhesive layer.

In a second aspect, a display apparatus is provided in implementations of the disclosure. The display apparatus includes a back-light module and the above display panel. The display panel is located at a light-exiting side of the back-light module, and the back-light module is configured to provide lights for the display panel.

In a third aspect, a manufacturing method of a display panel is provided in implementations of the disclosure. The manufacturing method is used to manufacture the above display panel. The manufacturing method includes the following. A first substrate is provided and a light-shielding layer and a planarization layer are formed sequentially on the first substrate, to form a first substrate assembly. A second substrate is provided and a metal layer and an insulating layer are formed sequentially on the second substrate, to form a second substrate assembly. A sealing frame assembly is manufactured between the first substrate assembly and the second substrate assembly to form the display panel, where the sealing frame assembly includes a first electrode, a sealing frame adhesive layer, and a second electrode that are stacked sequentially. Particulate media are disposed in the sealing frame adhesive layer. The particulate media are deflected or expanded or contracted under action of different preset electrical fields defined between the first electrode and the second electrode to adjust a thickness of the sealing frame adhesive layer.

BRIEF DESCRIPTION OF THE DRAWINGS

To illustrate technical solutions of implementations of the disclosure more clearly, the following will give a brief introduction to accompanying drawings used for illustrating implementations. Apparently, the accompanying drawings hereinafter illustrated are some implementations of the disclosure. Based on these drawings, those of ordinary skill in the art can also obtain other drawings without creative effort.

FIG. 10 is a schematic flow chart illustrating a manufacturing method of a display panel disclosed in implementations of the disclosure.

FIG. 11 is a schematic diagram illustrating a corresponding structure formed at S310 in a manufacturing method of a display panel disclosed in implementations of the disclosure.

FIG. 13 is a schematic flow chart illustrating an operation at S330 in a manufacturing method of a display panel disclosed in implementations of the disclosure.

Figure 1:
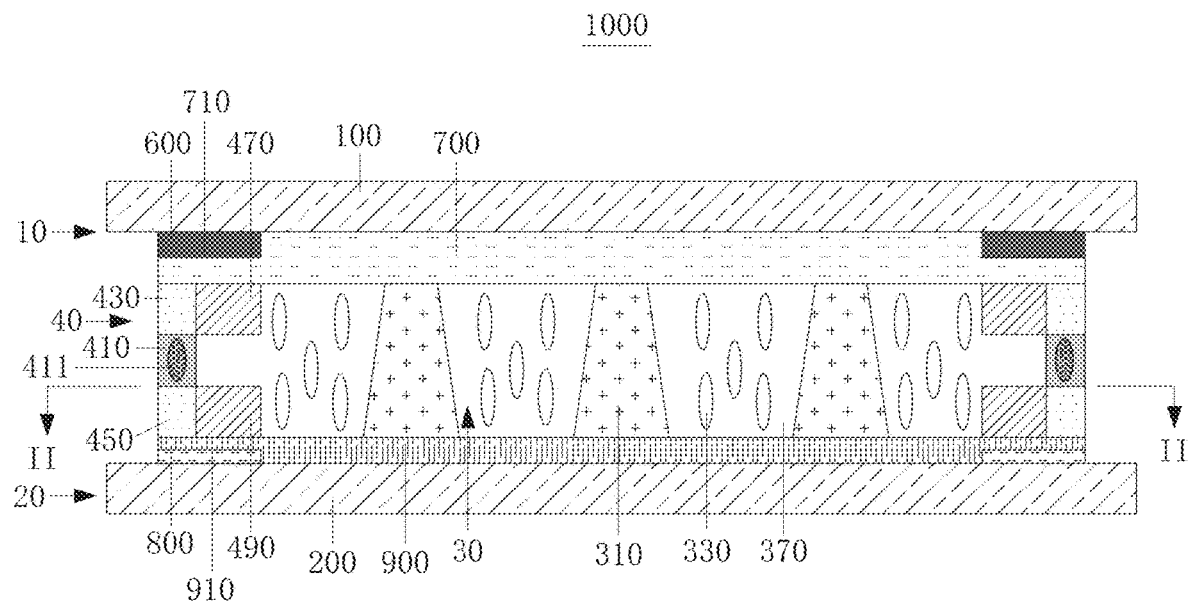
FIG. 1 is a schematic diagram illustrating a layer structure of a display panel disclosed in implementations of the disclosure.

Description of reference signs of the accompanying drawings: 1000 (2000)—display panel; 10—first substrate assembly; 20—second substrate assembly; 100—first substrate; 200—second substrate; 30—liquid crystal layer; 310—support member; 330—liquid crystal molecule; 370—accommodation space; 40—sealing frame assembly; 410—sealing frame adhesive layer; 411—particulate medium; 430—first electrode; 450—second electrode; 470—first insulating sealing-frame-layer; 490—second insulating sealing-frame-layer; 600—light-shielding layer; 700 planarization layer; 710—first recess; 800—metal layer; 900—insulating layer; 910—second recess; 3000—back-light module; 4000—display apparatus; S310—operation at S310; S320—operation at S320; S330—operation at S330; S331—operation at S331; S332—operation at S332; S333—operation at S333; S334—operation at S334; S340—operation at S340.

DETAILED DESCRIPTION

In order to facilitate understanding of the disclosure, a detailed description will now be given with reference to relevant accompanying drawings. The accompanying drawings illustrate some examples of implementations of the disclosure. However, the disclosure can be implemented in many different forms and is not limited to the implementations described herein. On the contrary, these implementations are provided for a more thorough and comprehensive understanding of contents disclosed of the disclosure.

The following implementations are described with reference to the accompanying drawings to exemplify particular implementations that can be implemented in the disclosure. The serial numbers of components herein, such as "first", "second", etc., are merely used to distinguish objects described herein and do not have any sequential or technical meaning. The terms "connecting" and "coupling" in the disclosure includes direct and indirect connecting (coupling), unless otherwise specified. The directional terms mentioned in the disclosure, such as "on", "under", "front", "back", "left", "right", "in", "out", "side", are directions with reference to the accompanying drawings, and thus use of the directional terms are intended to better and more clearly describe and understand the disclosure, rather than explicitly or implicitly indicate that apparatuses or members referred to herein must have a certain direction or be structured or operated in a certain direction, and therefore cannot be understood as limitations to the disclosure.

In illustration of the disclosure, it should be noted that, unless expressly stated and limited otherwise, terms "installing", "coupling", and "connecting" should be understood in broader sense. For example, they may include a fixed coupling, a removable coupling, or an integrated coupling; they may include a mechanical coupling; they may include a direct coupling, an indirect coupling through a medium, or an interconnection between two members. For those of ordinary skill in the art, specific meanings of the above terms in the disclosure can be understood according to specific situations. It needs to be noted that, the terms "first", "second", and the like used in the specification, the claims, and the accompany drawings of the disclosure are used to distinguish different objects rather than describe a particular order. In addition, the term "include", "may include", "comprise", or "may comprise" used in the disclosure indicates existence of a corresponding function, an operation, a member, etc. disclosed, and does not limit one or more other functions, operations, members, etc. In addition, the term "include" or "comprise" indicates existence of a corresponding feature, number, step, operation, element, component, or combination thereof disclosed in the disclosure, without excluding existence or addition of one or more other features, numbers, steps, operations, elements, components, or combinations thereof, with an intent to cover non-exclusive inclusion. It further needs to be understood that, "at least one" described herein means one and more, such as one, two, three, etc., and "more" means at least two, such as two or three, unless otherwise expressly and specifically limited.

Unless otherwise defined, all technical and scientific terms used herein have the same meaning as commonly understood by those skilled in the art of the disclosure. The terms used herein in the disclosure are for the purpose of describing implementations only and are not intended to limit the disclosure.

Figure 2:
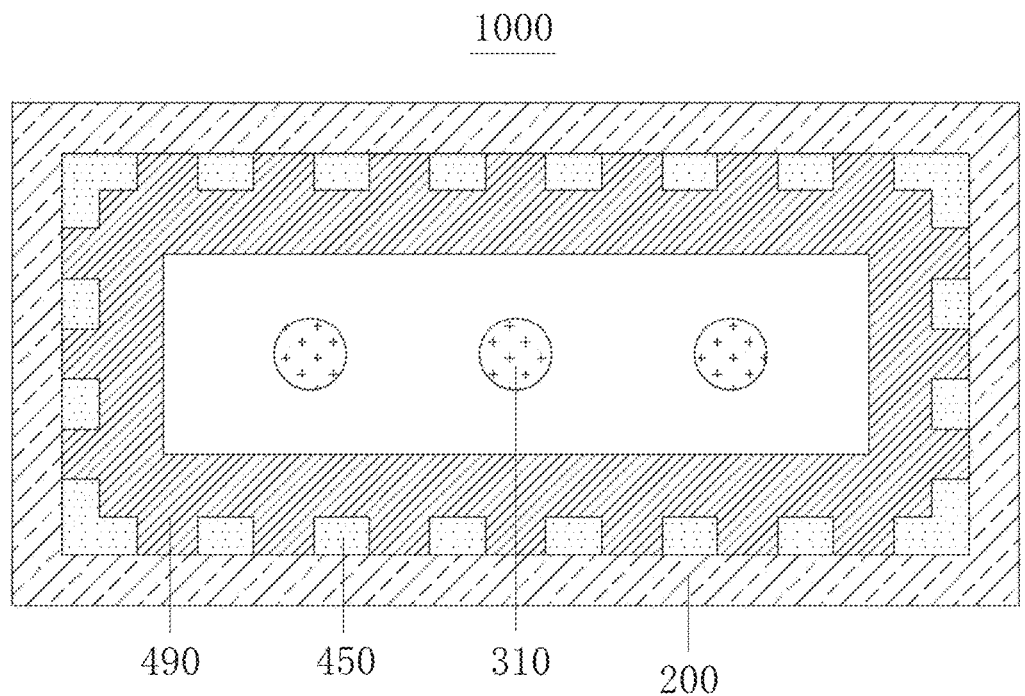
FIG. 2 is a schematic top structural view of a cross section of the display panel illustrated in FIG. 1 along a direction of II-II.

Referring to FIG. 1 and FIG. 2, FIG. 1 is a schematic diagram illustrating a layer structure of a display panel disclosed in implementations of the disclosure, and FIG. 2 is a schematic top structural view of a cross section of the display panel illustrated in FIG. 1 along a direction of II-II. As illustrated in FIG. 1 and FIG. 2, a display panel 1000 provided in implementations of the disclosure may include at least a first substrate assembly 10, a second substrate assembly 20, a liquid crystal layer 30 located between the first substrate assembly 10 and the second substrate assembly 20, and a sealing frame assembly 40 located around a periphery of the liquid crystal layer 30. That is, the first substrate assembly 10, the liquid crystal layer 30, and the second substrate assembly 20 are sequentially stacked, and the sealing frame assembly 40 is located between the first substrate assembly 10 and the second substrate assembly 20 and disposed around the periphery of the liquid crystal layer 30. The sealing frame assembly 40 is used to support the first substrate assembly 10 and the second substrate assembly 20, and seal the liquid crystal layer 30 between the first substrate assembly 10 and the second substrate assembly 20.

In implementations of the disclosure, the display panel 1000 includes a display region and a non-display region that is disposed around a periphery of the display region. The liquid crystal layer 30 is disposed corresponding to the display region, and the sealing frame assembly 40 is disposed corresponding to the non-display region.

In implementations of the disclosure, the sealing frame assembly 40 is fixed to the first substrate assembly 10 and the second substrate assembly 20 through bounding.

In an exemplary implementation, as illustrated in FIG. 1 and FIG. 2, the liquid crystal layer 30 includes multiple support members 310 and multiple liquid crystal molecules 330. The multiple support members 310 are located between the first substrate assembly 10 and the second substrate assembly 20 and located at an inside of the sealing frame assembly 40. The liquid crystal molecules 330 are located in multiple accommodation spaces 370 that are defined among the first substrate assembly 10, the second substrate assembly 20, and the multiple support members 310. The support members 310 are configured to support in the display region of the display panel 1000. The sealing frame assembly 40 is configured to support in the non-display region of the display panel 1000. That is, the multiple support members 310 are located between the first substrate assembly 10 and the second substrate assembly 20 and disposed corresponding to the display region. The sealing frame assembly 40 is located between the first substrate assembly 10 and the second substrate assembly 20, disposed corresponding to the non-display region, and disposed around an external periphery of the multiple support members 310.

It can be understood that, the multiple support members 310 have a same height, such that a distance between the first substrate assembly 10 and the second substrate assembly 20 is consistent everywhere, and thus the amount of liquid crystals in each of the accommodation spaces 370 is consistent. That is, a height of liquid crystals in each of the accommodation spaces 370 is consistent, thereby implementing even display effect of the whole display region.

In an exemplary implementation, the support members 310 each may be a spacer column.

In implementations of the disclosure, as illustrated in FIG. 1, the sealing frame assembly 40 includes a sealing frame adhesive layer 410, at least one first electrode 430, and at least one second electrode 450, all of which are located between the first substrate assembly 10 and the second substrate assembly 20. Particulate media 411 are disposed in the sealing frame adhesive layer 410. The at least one first electrode 430 is disposed at one side of the sealing frame adhesive layer 410 facing the first substrate assembly 10, and the at least one second electrode 450 is disposed at one side of the sealing frame adhesive layer 410 facing the second substrate assembly 20. That is, the at least one first electrode 430, the sealing frame adhesive layer 410, and the at least one second electrode 450 are sequentially stacked in a direction from the first substrate assembly 10 to the second substrate assembly 20. The sealing frame adhesive layer 410 is located between the at least one first electrode 430 and the at least one second electrode 450. The at least one first electrode 430 and the at least one second electrode 450 are used to define different preset electrical fields, and the particulate media 411 are deflected or expanded or contracted under action of the different preset electrical fields to adjust a thickness of the sealing frame adhesive layer 410, thereby adjusting a thickness of the display panel 1000.

In an exemplary implementation, the at least one first electrode 430, the sealing frame adhesive layer 410, and the at least one second electrode 450 can also be sequentially stacked in a direction from the second substrate assembly 20 to the first substrate assembly 10, which is not specially limited in the disclosure.

Figure 3:
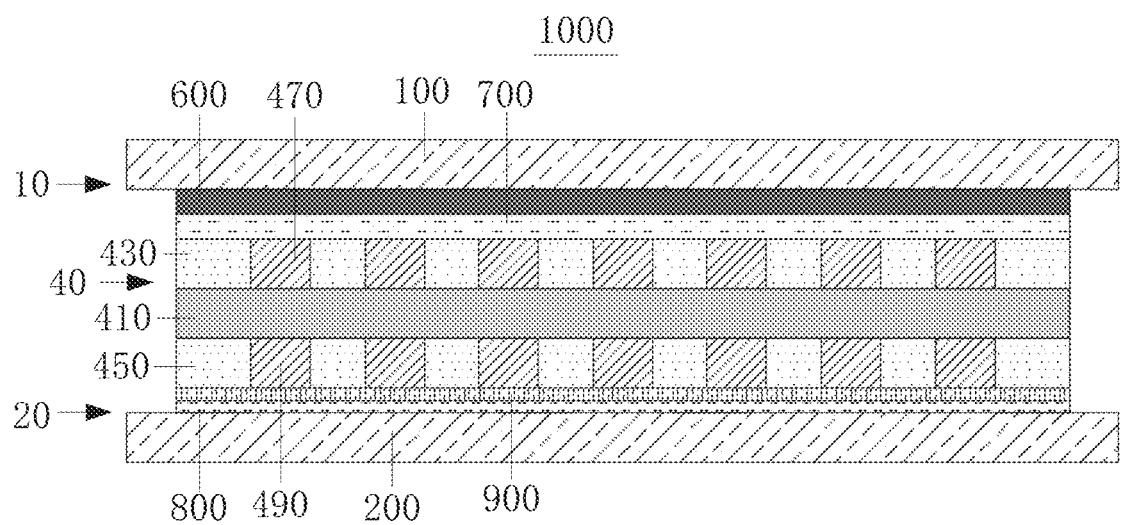
FIG. 3 is a schematic front structural view of a display panel disclosed in implementations of the disclosure.

In implementations of the disclosure, as illustrated in FIG. 2 and FIG. 3, FIG. 3 is a schematic front structural view of a display panel disclosed in implementations of the disclosure. The sealing frame assembly 40 includes multiple first electrodes 430 and multiple second electrodes 450, where the multiple first electrodes 430 are arranged at intervals around the periphery of the liquid crystal layer 30, and the multiple second electrodes 450 are arranged at intervals around the periphery of the liquid crystal layer 30. The multiple first electrodes 430 are disposed at the side of the sealing frame adhesive layer 410 facing the first substrate assembly 10, and the multiple second electrodes 450 are disposed at the side of the sealing frame adhesive layer 410 facing the second substrate assembly 20. The sealing frame adhesive layer 410 is located among the multiple first electrodes 430 and the multiple second electrodes 450, and the liquid crystal layer 30 is sealed between the first substrate assembly 10 and the second substrate assembly 20.

In an exemplary implementation, the number of the multiple first electrodes 430 is the same as that of the multiple second electrodes 450, and the multiple first electrodes 430 disposed at one side of the sealing frame adhesive layer 410 and the multiple second electrodes 450 disposed at an opposite side of the sealing frame adhesive layer 410 are in one-to-one correspondence. That is, orthographic projections of the multiple first electrodes 430 on the second substrate assembly 20 completely overlap those of the multiple second electrodes 450 on the second substrate assembly 20.

It can be understood that, the multiple first electrodes 430 arranged at intervals at the side of the sealing frame adhesive layer 410 and the multiple second electrodes 450 arranged at intervals at the opposite side of the sealing frame adhesive layer 410 can adjust a thickness of a part of the sealing frame adhesive layer 410, thereby adjusting a thickness of a part of the display panel 1000, and thus improving accuracy of thickness adjustment of the non-display region and implementing consistency of a thickness of the display region and a thickness of the non-display region.

In an exemplary implementation, each of the multiple first electrodes 430 has a thickness same as each of the multiple second electrodes 450.

In an exemplary implementation, a side surface of each of the multiple first electrodes 430 facing the liquid crystal layer 30 is flush with that of each of the multiple second electrodes 450 facing the liquid crystal layer 30, and a side surface of each of the multiple first electrodes 430 away from the liquid crystal layer 30 is flush with that of each of the multiple second electrodes 450 away from the liquid crystal layer 30.

It can be understood that, after bonding the first substrate assembly 10 to the second substrate assembly 20 with the sealing frame assembly 40, the thickness of the display region and the thickness of the non-display region are measured before the sealing frame assembly 40 is cured. If the thickness of the display region is different from the thickness of the non-display region, the different preset electrical fields are defined among the multiple first electrodes 430 and the multiple second electrodes 450, and the particulate media 411 are deflected or expanded or contracted under action of the different preset electrical fields, such that the thickness of the sealing frame adhesive layer 410 is increased or decreased accordingly, thereby controlling the thickness of the non-display region of the display panel 1000 to match the thickness of the display region.

It can be understood that, the thickness of the display panel 1000 is a sum of the distance between the first substrate assembly 10 and the second substrate assembly 20, a thickness of the first substrate assembly 10, and a thickness of the second substrate assembly 20.

In implementations of the disclosure, the particulate media 411 are piezoelectric material particles, and the piezoelectric material particles are expanded or contracted under action of the different preset electrical fields to adjust the thickness of the sealing frame adhesive layer 410.

In implementations of the disclosure, the piezoelectric material particles are made of any one or more of polyvinylidene fluoride, lead meta-niobate, lithium galliate, lithium germanate, titanium germanate, iron-transistor lithium niobate, and iron-transistor lithium tantalate that have a mass ratio ranging from 1% to 10%.

In implementations of the disclosure, the particulate media 411 are deflected under action of the different preset electrical fields to adjust an angle between each of length directions of the particulate media 411 and each of directions of the different preset electrical fields, thereby changing the thickness of the sealing frame adhesive layer 410.

In an exemplary implementation, an overall shape of each of the particulate media 411 may be an elliptical cylinder, where the elliptical cylinder has a long axis and a short axis, and the long axis is a length direction of each of the particulate media 411. The particulate media 411 are deflected under action of the different preset electrical fields to change an angle between each of long axes of the particulate media 411 and each of the directions of the different preset electrical fields.

Figure 4:
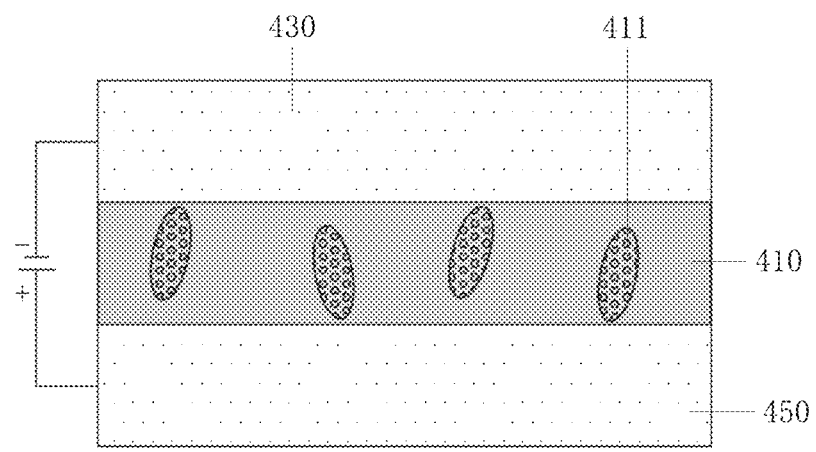
FIG. 4 is a schematic diagram illustrating a status of a sealing frame adhesive layer illustrated in FIG. 1 of the disclosure in a first preset electrical field.
Figure 5:
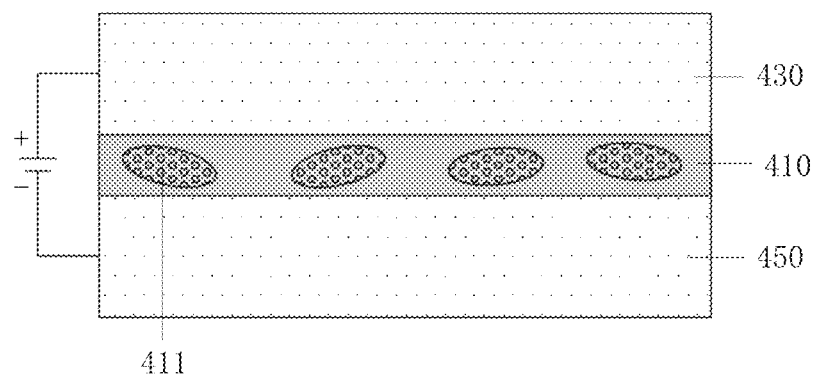
FIG. 5 is a schematic diagram illustrating a status of a sealing frame adhesive layer illustrated in FIG. 1 of the disclosure in a second preset electrical field.

Referring to FIG. 4 and FIG. 5, FIG. 4 is a schematic diagram illustrating a status of a sealing frame adhesive layer illustrated in FIG. 1 of the disclosure in a first preset electrical field, and FIG. 5 is a schematic diagram illustrating a status of a sealing frame adhesive layer illustrated in FIG. 1 of the disclosure in a second preset electrical field. In an exemplary implementation, as illustrated in FIG. 4, the at least one first electrode 430 is supplied with a negative voltage, the at least one second electrode 450 is supplied with a positive voltage, and thus a first preset electrical field is defined between the at least one first electrode 430 and the at least one second electrode 450. The particulate media 411 in the sealing frame adhesive layer 410 are deflected under action of the first preset electrical field to increase the thickness of the sealing frame adhesive layer 410, thereby increasing the thickness of the non-display region of the display panel 1000. As illustrated in FIG. 5, the at least one first electrode 430 is supplied with a positive voltage, the at least one second electrode 450 is supplied with a negative voltage, and thus a second preset electrical field is defined between the at least one first electrode 430 and the at least one second electrode 450. The particulate media 411 in the sealing frame adhesive layer 410 are deflected under action of the second preset electrical field to contract the sealing frame adhesive layer 410, thereby decreasing the thickness of the non-display region of the display panel 1000.

It can be understood that, a physical principle corresponding to deflection of the piezoelectric material particles under action of the different preset electrical fields is called inverse piezoelectric effect. In other implementations, the at least one first electrode 430 can also be supplied with a negative voltage, and the at least one second electrode 450 can also be supplied with a positive voltage, such that the thickness of the non-display region of the display panel 1000 is decreased; the at least one first electrode 430 can also be supplied with a positive voltage, and the at least one second electrode 450 can also be supplied with a negative voltage, such that the thickness of the non-display region of the display panel 1000 is increased, which is not specifically limited in implementations of the disclosure.

In an exemplary implementation, the length direction of each of the particulate media 411 is a line connecting two points that are farthest away from each other on a surface of each of the particulate media.

To sum up, the display panel 1000 provided in implementations of the disclosure may include at least the first substrate assembly 10, the second substrate assembly 20, the liquid crystal layer 30 located between the first substrate assembly 10 and the second substrate assembly 20, and the sealing frame assembly 40 located around the periphery of the liquid crystal layer 30. The sealing frame assembly 40 includes the sealing frame adhesive layer 410, the at least one first electrode 430, and the at least one second electrode 450, all of which are disposed around the periphery of the liquid crystal layer 30. The particulate media 411 are disposed in the sealing frame adhesive layer 410. The at least one first electrode 430 is connected between the first substrate assembly 10 and the sealing frame adhesive layer 410, and the at least one second electrode 450 is connected between the sealing frame adhesive layer 410 and the second substrate assembly 20. The at least one first electrode 430 and the at least one second electrode 450 are used to define the different preset electrical fields, and the particulate media 411 are deflected or expanded or contracted under action of the different preset electrical fields to adjust the thickness of the sealing frame adhesive layer 410, thereby adjusting the thickness of the display panel 1000. The sealing frame assembly 40 includes the multiple first electrodes 430 and the multiple second electrodes 450, where the multiple first electrodes 430 are arranged at intervals around the periphery of the liquid crystal layer 30, and the multiple second electrodes 450 are arranged at intervals around the periphery of the liquid crystal layer 30, thereby adjusting a thickness of a part of the sealing frame adhesive layer 410, and thus improving accuracy of thickness adjustment of the non-display region. Therefore, by disposing in the sealing frame adhesive layer 410 the particulate media 411 that can be deflected or expanded or contracted under action of the electrical fields, the thickness of the sealing frame adhesive layer 410 can be increased or decreased to match a thickness of each of the multiple support members 310 in the liquid crystal layer 30, thereby avoiding occurrence of display unevenness of the display panel 1000 and improving display quality of the display panel 1000.

In implementations of the disclosure, as illustrated in FIG. 1, the sealing frame assembly 40 further includes a first insulating sealing-frame-layer 470 and a second insulating sealing-frame-layer 490, where the first insulating sealing-frame-layer 470 is disposed at one side of each of the at least one first electrode 430 facing the liquid crystal layer 30, and the second insulating sealing-frame-layer 490 is disposed at one side of each of the at least one second electrode 450 facing the liquid crystal layer 30. The first insulating sealing-frame-layer 470 is configured to insulate the at least one first electrode 430 from the liquid crystal layer 30, and the second insulating sealing-frame-layer 490 is configured to insulate the at least one second electrode 450 from the liquid crystal layer 30.

It can be understood that, normal deflection of the liquid crystal molecules 330 adjacent to the periphery of the display region is prone to be affected after the at least one first electrode 430 and the at least one second electrode 450 are energized, thereby affecting a display function of the display panel 1000. The first insulating sealing-frame-layer 470 and the second insulating sealing-frame-layer 490 avoid that normal deflection of liquid crystal molecules 330 adjacent to the periphery of the display region is affected after the at least one first electrode 430 and the at least one second electrode 450 are energized.

In an exemplary implementation, the first insulating sealing-frame-layer 470 has a thickness same as each of the at least one first electrode 430. That is, a surface of the first insulating sealing-frame-layer 470 facing the first substrate assembly 10 is flush with a surface of each of the at least one first electrode 430 facing the first substrate assembly 10, and a surface of the first insulating sealing-frame-layer 470 away from the first substrate assembly 10 is flush with a surface of each of the at least one first electrode 430 away from the first substrate assembly 10. The second insulating sealing-frame-layer 490 has a thickness same as each of the at least one second electrode 450. That is, a surface of the second insulating sealing-frame-layer 490 facing the second substrate assembly 20 is flush with a surface of each of the at least one second electrode 450 facing the second substrate assembly 20, and a surface of the second insulating sealing-frame-layer 490 away from the second substrate assembly 20 is flush with a surface of each of the at least one second electrode 450 away from the second substrate assembly 20.

As illustrated in FIG. 3, when the sealing frame assembly 40 includes the multiple first electrodes 430 arranged at intervals around the periphery of the liquid crystal layer 30 and the multiple second electrodes 450 arranged at intervals around the periphery of the liquid crystal layer 30, the first insulating sealing-frame-layer 470 is disposed around the periphery of the liquid crystal layer 30 and filled among the multiple first electrodes 430, and the second insulating sealing-frame-layer 490 is disposed around the periphery of the liquid crystal layer 30 and filled among the multiple second electrodes 450. That is, the first insulating sealing-frame-layer 470 is filled in gaps among the multiple first electrodes 430, and the second insulating sealing-frame-layer 490 is filled in gaps among the multiple second electrodes 450.

In an exemplary implementation, each of the first insulating sealing-frame-layer 470 and the second insulating sealing-frame-layer 490 has a width greater than 100 microns (μm). That is, a distance between a side surface of the first insulating sealing-frame-layer 470 facing each of the multiple first electrodes 430 and a side surface of the first insulating sealing-frame-layer 470 away from each of the multiple first electrodes 430 is greater than 100 μm, and a distance between a side surface of the second insulating sealing-frame-layer 490 facing each of the multiple second electrodes 450 and a side surface of the second insulating sealing-frame-layer 490 away from each of the multiple second electrodes 450 is greater than 100 μm. It can be understood that, if the width of each of the first insulating sealing-frame-layer 470 and the second insulating sealing-frame-layer 490 is less than 100 μm, normal deflection of the liquid crystal molecules 330 adjacent to the periphery of the display region can still be affected after the multiple first electrodes 430 and the multiple second electrodes 450 are energized.

In implementations of the disclosure, as illustrated in FIG. 1, the first substrate assembly 10 includes a first substrate 100, a light-shielding layer 600, and a planarization layer 700. The planarization layer 700 is disposed at one side of the liquid crystal layer 30 away from the second substrate assembly 20 and one side of the sealing frame assembly 40 away from the second substrate assembly 20. The planarization layer 700 defines a first recess 710 at a periphery of a surface away from the liquid crystal layer 30, and the light-shielding layer 600 is embedded in the first recess. The first substrate 100 is disposed on the surface of the planarization layer 700 away from the liquid crystal layer 30 and a surface of the light-shielding layer 600 away from the planarization layer 700. The light-shielding layer 600 is disposed corresponding to the non-display region to shield lights. The planarization layer 700 is disposed corresponding to the display region and the non-display region to planarize a surface of the first substrate assembly 10 facing the liquid crystal layer 30.

It can be understood that, the first substrate 100 may be a color substrate and includes a first glass substrate and a color resist layer (not shown in the figures). A surface of the color resist layer away from the first glass substrate is not completely smooth, such that an overall thickness of the first substrate 100 is not completely consistent. Therefore, the planarization layer 700 is formed on the surface of the color resist layer away from the first glass substrate and a surface of the light-shielding layer 600 away from the first substrate 100, such that the overall thickness of the first substrate assembly 10 is consistent, which is conducive to ensuring that an overall thickness of the display panel 1000 is consistent. In addition, if the support members 310 are directly fixed on the surface of the color resist layer away from the first glass substrate, the support members 310 are not completely contacted with a surface of the color resist layer connected with the support members 310 due to un-smoothness of the surface of the color resist layer away from the first glass substrate. Therefore, the planarization layer 700 increases fixed areas of the support members 310, such that the sealing frame assembly 40 can better bond the first substrate assembly 10 to the second substrate assembly 20, and the support members 310 are fixed more strongly.

In implementations of the disclosure, the light-shielding layer 600 is located in the non-display region and corresponds to the sealing frame assembly 40 in position. The planarization layer 700 is located in both the display region and the non-display region. The first substrate 100 is located in both the display region and the non-display region.

In an exemplary implementation, the light-shielding layer 600 is matched with the first recess 710 in shape and size.

In an exemplary implementation, an inner side surface of the light-shielding layer 600 is flush with a side surface of the first insulating sealing-frame-layer 470 away from each of the at least one first electrode 430, and an outer side surface of the light-shielding layer 600 is flush with a side surface of each of the at least one first electrode 430 away from the first insulating sealing-frame-layer 470.

In an exemplary implementation, the light-shielding layer 600 may be a Black Matrix (BM).

It can be understood that, the BM formed in the non-display region of the display panel 1000 can avoid light leakage around the periphery of the display panel 1000.

In implementations of the disclosure, as illustrated in FIG. 1, the second substrate assembly 20 includes a second substrate 200, a metal layer 800, and an insulating layer 900. The insulating layer 900 is disposed at one side of the liquid crystal layer 30 away from the first substrate assembly 10 and one side of the sealing frame assembly 40 away from the first substrate assembly 10. The insulating layer 900 defines a second recess 910 at a periphery of a surface away from the sealing frame assembly 40, and the metal layer 800 is embedded in the second recess 910. The second substrate 200 is disposed on a surface of the insulating layer 900 away from the liquid crystal layer 30 and a surface of the metal layer 800 away from the insulating layer 900. The metal layer 800 is electrically coupled with the second substrate 200 to transmit an electrical signal to the second substrate 200. The insulating layer 900 is configured to insulate the sealing frame assembly 40 from the metal layer 800 and insulate the liquid crystal layer 30 from the second substrate 200.

It can be understood that, the insulating layer 900 avoids that normal deflection of liquid crystal molecules 330 adjacent to the second substrate 200 is affected after the metal layer 800 and the second substrate 200 are energized, thereby affecting the display function of the display panel 1000.

In implementations of the disclosure, the metal layer 800 is located in the non-display region and corresponds to the sealing frame assembly 40 in position. The insulating layer 900 is located in both the display region and the non-display region. The second substrate 200 is located in both the display region and the non-display region.

In an exemplary implementation, the metal layer 800 is matched with the second recess 910 in shape and size.

In an exemplary implementation, an inner side surface of the metal layer 800 is flush with a side surface of the second insulating sealing-frame-layer 490 away from each of the at least one second electrode 450, and an outer side surface of the metal layer 800 is flush with a side surface of each of the at least one second electrode 450 away from the second insulating sealing-frame-layer 490.

In an exemplary implementation, the first substrate 100 may be a color substrate for color display, and the second substrate 200 may be an array substrate for electrical signal controlling. In other implementations, the first substrate 100 may be an array substrate for electrical signal controlling, and the second substrate 200 may be a color substrate for color display.

It can be understood that, the liquid crystal layer 30 and the sealing frame adhesive 40 are located between the planarization layer 700 and the insulating layer 900, and each of the support members 310 is connected with the planarization layer 700 and the insulating layer 900 at two opposite ends.

Figure 6:
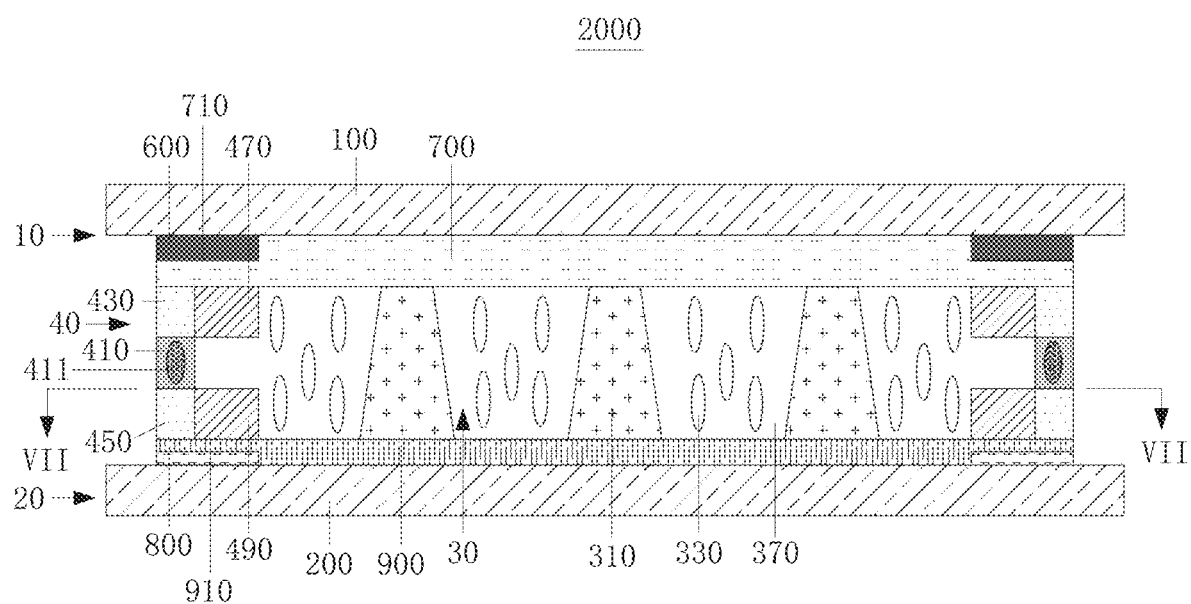
FIG. 6 is a schematic diagram illustrating a layer structure of a display panel disclosed in other implementations of the disclosure.
Figure 7:
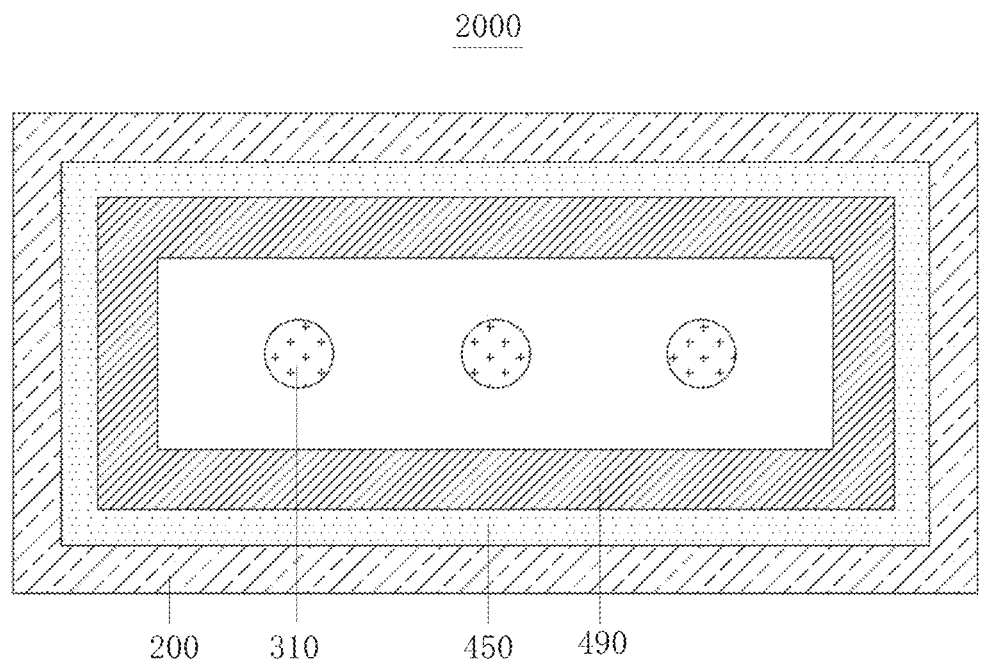
FIG. 7 is a schematic top structural view of a cross section of the display panel illustrated in FIG. 6 along a direction of VII-VII.
Figure 8:
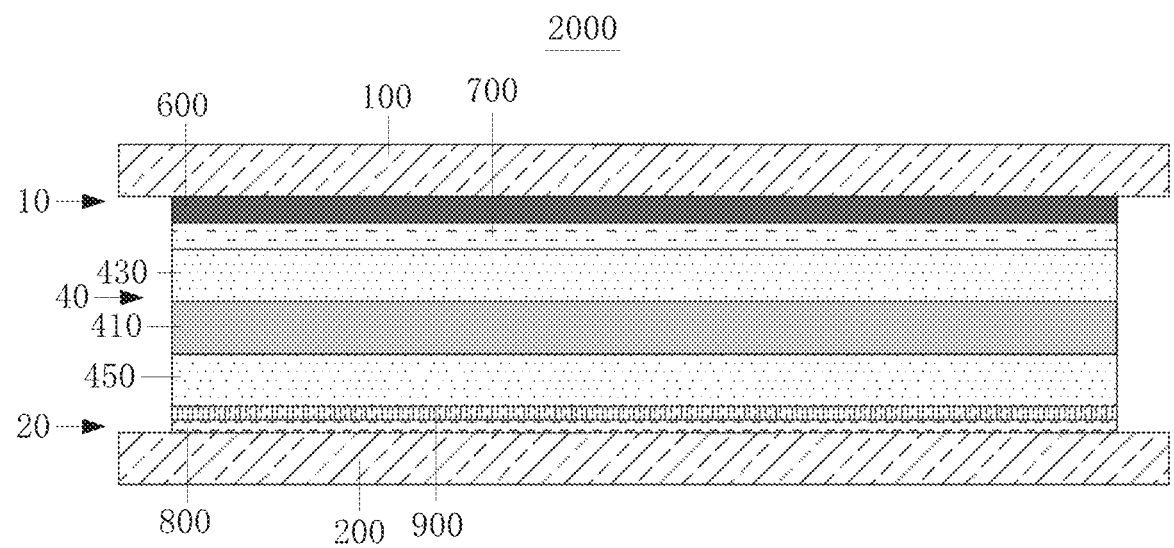
FIG. 8 is a schematic front structural view of a display panel disclosed in other implementations of the disclosure.

Referring to FIG. 6 to FIG. 8, FIG. 6 is a schematic diagram illustrating a layer structure of a display panel disclosed in other implementations of the disclosure, FIG. 7 is a schematic top structural view of a cross section of the display panel illustrated in FIG. 6 along a direction of VII-VII, and FIG. 8 is a schematic front structural view of a display panel disclosed in other implementations of the disclosure. As illustrated in FIG. 6 to FIG. 8, a difference between a display panel 2000 illustrated in FIGS. 6-8 and the display panel 1000 illustrated in FIGS. 1-5 lies in that the sealing frame assembly 40 does not include the multiple first electrodes 430 arranged at intervals around the periphery of the liquid crystal layer 30 and the multiple second electrodes 450 arranged at intervals around the periphery of the liquid crystal layer 30.

In implementations of the disclosure, the sealing frame assembly 40 includes one first electrode 430 disposed around the periphery of the liquid crystal layer 30 and one second electrode 450 disposed around the periphery of the liquid crystal layer 30. The first electrode 430 is disposed at one side of the sealing frame adhesive layer 410 facing the first substrate assembly 10, and the second electrode 450 is disposed at one side of the sealing frame adhesive layer 410 facing the second substrate assembly 20. The sealing frame adhesive layer 410 is located between the first electrode 430 and the second electrode 450, and the liquid crystal layer 30 is sealed between the first substrate assembly 10 and the second substrate assembly 20.

As illustrated in FIG. 6 and FIG. 7, in this case, the first insulating sealing-frame-layer 470 is disposed at one side of the first electrode 430 facing the liquid crystal layer 30 and attached to the first electrode 430. The second insulating sealing-frame-layer 490 is disposed at one side of the second electrode 450 facing the liquid crystal layer 30 and attached to the second electrode 450.

In an exemplary implementation, the first electrode 430 disposed at one side of the sealing frame adhesive layer 410 corresponds to the second electrode 450 disposed at the other opposite side of the sealing frame adhesive layer 410. That is, an orthographic projection of the first electrode 430 on the second substrate assembly 20 completely overlaps that of the second electrode 450 on the second substrate assembly 20. For illustration of a similarity between the display panel 2000 illustrated in FIGS. 6-8 and the display panel 1000 illustrated in FIGS. 1-5, reference can be made to the illustration of the display panel 1000 illustrated in FIGS. 1-5, which is not repeated herein.

It can be understood that, the first electrode 430 and the second electrode 450 that are disposed around the periphery of the liquid crystal layer 30 can adjust an overall thickness of the display panel 2000.

To sum up, the display panel 2000 provided in implementations of the disclosure may include at least the first substrate assembly 10, the second substrate assembly 20, the liquid crystal layer 30 located between the first substrate assembly 10 and the second substrate assembly 20, and the sealing frame assembly 40 located around the periphery of the liquid crystal layer 30. The sealing frame assembly 40 includes the sealing frame adhesive layer 410, the at least one first electrode 430, and the at least one second electrode 450, all of which are disposed around the periphery of the liquid crystal layer 30. The particulate media 411 are disposed in the sealing frame adhesive layer 410. The at least one first electrode 430 is connected between the first substrate assembly 10 and the sealing frame adhesive layer 410, and the at least one second electrode 450 is connected between the sealing frame adhesive layer 410 and the second substrate assembly 20. Different preset electrical fields are defined between the at least one first electrode 430 and the at least one second electrode 450, and the particulate media 411 are deflected or expanded or contracted under action of corresponding preset electrical fields to adjust a thickness of the sealing frame adhesive layer 410, thereby adjusting a thickness of the display panel 2000. The sealing frame assembly 40 further includes the first insulating sealing-frame-layer 470 disposed at a side surface of each of the at least one first electrode 430 facing the liquid crystal layer 30 and the second insulating sealing-frame-layer 490 disposed at a side surface of each of the at least one second electrode 450 facing the liquid crystal layer 30. The sealing frame assembly 40 includes the first electrode 430 disposed around the periphery of the liquid crystal layer 30 and the second electrode 450 disposed around the periphery of the liquid crystal layer 30, thereby adjusting the overall thickness of the display panel 2000. Therefore, by disposing in the sealing frame adhesive layer 410 the particulate media 411 that can be deflected or expanded or contracted under action of the electrical fields, the thickness of the sealing frame adhesive layer 410 can be increased or decreased to match a height of each of the multiple support members 310 in the liquid crystal layer 30, thereby avoiding occurrence of display unevenness of the display panel 2000 and improving display quality of the display panel 2000. The first insulating sealing-frame-layer 470 and the second insulating sealing-frame-layer 490 avoid that normal deflection of liquid crystal molecules 330 adjacent to the periphery of the display region is affected by the first electrode 430 and the second electrode 450, thereby affecting a display function of the display panel 2000.

Figure 9:
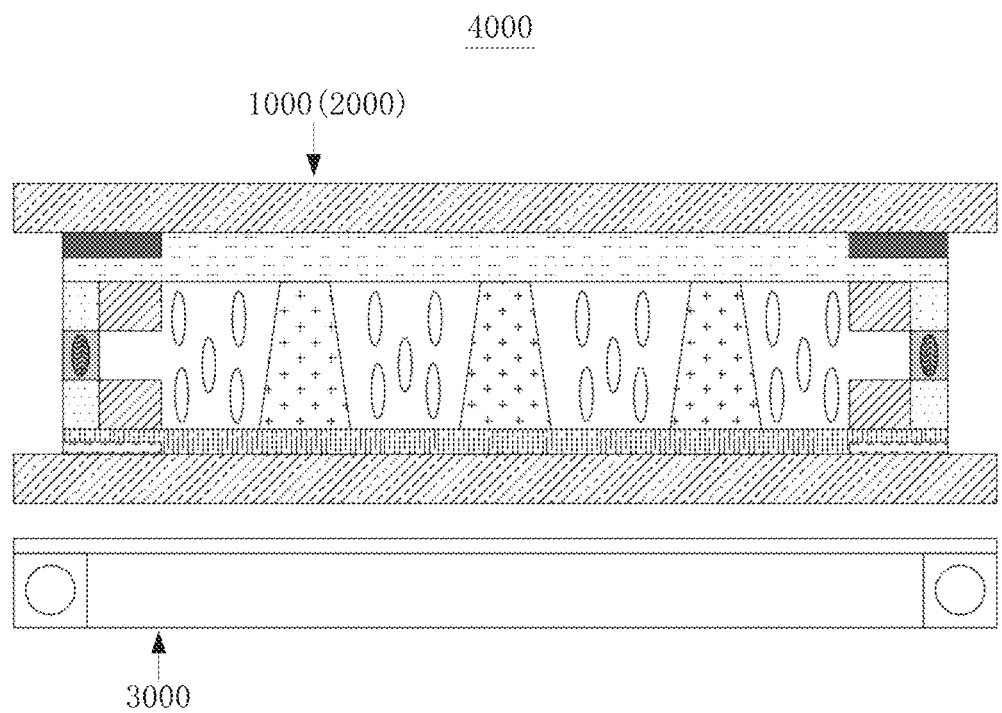
FIG. 9 is a schematic diagram illustrating a layer structure of a display apparatus disclosed in implementations of the disclosure.

Based on the same inventive concept, a display apparatus is provided in implementations of the disclosure. Referring to FIG. 9, FIG. 9 is a schematic diagram illustrating a layer structure of a display apparatus disclosed in implementations of the disclosure. As illustrated in FIG. 9, a display apparatus 4000 includes a back-light module 3000 and the above display panel 1000 (2000). The display panel 1000 (2000) is located at a light-exiting side of the back-light module 3000, and the back-light module 3000 is configured to provide lights for the display panel 1000 (2000). The display panel is already illustrated in detail in the foregoing implementations, which is not repeated herein.

It can be understood that, the display apparatus may be applied to an electronic device including, but not limited to, a tablet computer, a laptop computer, or a desktop computer. According to implementations of the disclosure, specific types of the display apparatus are not specially limited, and the display apparatus can be designed accordingly by those skilled in the art according to specific use requirements of an electronic apparatus with the display apparatus, which is not repeated herein.

In an implementation, the display apparatus further includes a driving board, a power supply board, a high voltage board, a key control board, and other necessary components and parts, which can be additionally disposed accordingly by those skilled in the art according to specific types and actual functions of the display apparatus, and is not repeated herein.

To sum up, the display apparatus 4000 provided in implementations of the disclosure includes the back-light module 3000 and the display panel 1000 (2000). The display panel 1000 (2000) may include at least the first substrate assembly 10, the second substrate assembly 20, the liquid crystal layer 30 located between the first substrate assembly 10 and the second substrate assembly 20, and the sealing frame assembly 40 located around the periphery of the liquid crystal layer 30. The sealing frame assembly 40 includes the sealing frame adhesive layer 410, the at least one first electrode 430, and the at least one second electrode 450, all of which are disposed around the periphery of the liquid crystal layer 30. The particulate media 411 are disposed in the sealing frame adhesive layer 410. The at least one first electrode 430 is connected between the first substrate assembly 10 and the sealing frame adhesive layer 410, and the at least one second electrode 450 is connected between the sealing frame adhesive layer 410 and the second substrate assembly 20. Different preset electrical fields are defined between the at least one first electrode 430 and the at least one second electrode 450, and the particulate media 411 are deflected or expanded or contracted under action of corresponding preset electrical fields to adjust a thickness of the sealing frame adhesive layer 410, thereby adjusting a thickness of the display panel 1000 (2000). The sealing frame assembly 40 includes the first insulating sealing-frame-layer 470 disposed at the side of each of the at least one first electrode 430 facing the liquid crystal layer 30 and the second insulating sealing-frame-layer 490 disposed at the side of each of the at least one second electrode 450 facing the liquid crystal layer 30. Therefore, by disposing in the sealing frame adhesive layer 410 the particulate media 411 that can be deflected or expanded or contracted under action of the electrical fields, the thickness of the sealing frame adhesive layer 410 can be increased or decreased to match a height of each of the multiple support members 310 in the liquid crystal layer 30, thereby avoiding occurrence of display unevenness of the display panel 1000 (2000) and improving display quality of the display panel 1000 (2000). The first insulating sealing-frame-layer 470 and the second insulating sealing-frame-layer 490 avoid that normal deflection of liquid crystal molecules 330 adjacent to the periphery of the display region is affected by the first electrode 430 and the second electrode 450, thereby affecting a display function of the display panel 1000 (2000).

Based on the same inventive concept, a manufacturing method of a display panel is provided in implementations of the disclosure. The above display panel 1000 (2000) is manufactured with the manufacturing method. Referring to FIG. 10, FIG. 10 is a schematic flow chart illustrating a manufacturing method of a display panel disclosed in implementations of the disclosure. As illustrated in FIG. 10, the manufacturing method includes at least the following.

S310, a first substrate 100 is provided and a light-shielding layer 600 and a planarization layer 700 are formed sequentially on the first substrate 100, to form a first substrate assembly 10.

Specifically, referring to FIG. 11, FIG. 11 is a schematic diagram illustrating a corresponding structure formed at S310 in a manufacturing method of a display panel disclosed in implementations of the disclosure. As illustrated in FIG. 11, the light-shielding layer 600 and the planarization layer 700 are formed sequentially on the first substrate 100 through a coat process. The coat process includes photoresist coating, exposure with a mask, development, etching, photoresist removal, etc.

In implementations of the disclosure, the first substrate 10 may be a color substrate for color display. The light-shielding layer 600 is located at a periphery of the first substrate 100, and the planarization layer 700 is located at a surface of the first substrate 100 where the light-shielding layer 600 is formed and a surface of the light-shielding layer 600 away from the first substrate 100.

In implementations of the disclosure, the first substrate 100 includes a first glass substrate (not shown in the figures) and a color resist layer (not shown in the figures). The light-shielding layer 600 is formed on a surface of the color resist layer away from the first glass substrate and located at a periphery of the color resist layer. The light-shielding layer 600 is configured to shield lights. The planarization layer 700 is formed on the surface of the first substrate 100 where the light-shielding layer 600 is formed and the surface of the light-shielding layer 600 away from the first substrate 100. The planarization layer 700 is configured to planarize the surface of the first substrate 100 where the light-shielding layer 600 is formed and the surface of the light-shielding layer 600 away from the first substrate 100. It can be understood that, the planarization layer 700 has a better light transmittance property.

S320, a second substrate 200 is provided and a metal layer 800 and an insulating layer 900 are formed sequentially on the second substrate 200, to form a second substrate assembly 20.

Figure 12:
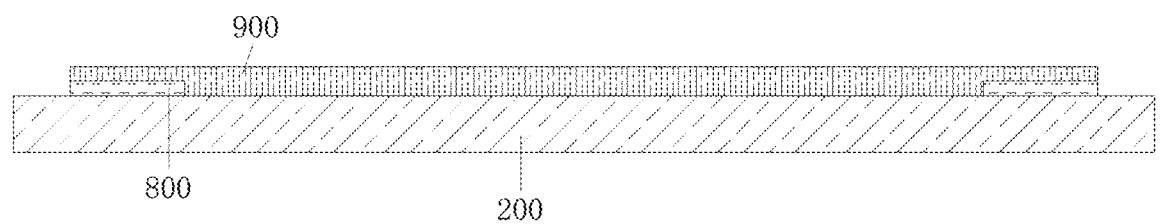
FIG. 12 is a schematic diagram illustrating a corresponding structure formed at S320 in a manufacturing method of a display panel disclosed in implementations of the disclosure.

Specifically, referring to FIG. 12, FIG. 12 is a schematic diagram illustrating a corresponding structure formed at S320 in a manufacturing method of a display panel disclosed in implementations of the disclosure. As illustrated in FIG. 12, the metal layer 800 is formed on the second substrate 200 through a sputter-coating process, and the insulating layer 900 is formed through the coat process on a surface of the metal layer 800 away from the second substrate 200 and a surface of the second substrate 200 where the metal layer 800 is formed.

In implementations of the disclosure, the second substrate 200 may be an array substrate for electrical signal controlling. The metal layer 800 is located at a periphery of the second substrate 200, and the insulating layer 900 is located at the surface of the second substrate 200 where the metal layer 800 is formed and the surface of the metal layer 800 away from the second substrate 200.

In implementations of the disclosure, the second substrate 200 includes a second glass substrate (not shown in the figures) and a transistor layer (not shown in the figures) that are stacked. The metal layer 800 is formed on a surface of the transistor layer away from the second glass substrate and located at a periphery of the transistor layer. The metal layer 800 is electrically coupled with the second substrate 200 to transmit an electrical signal to the second substrate 200. The insulating layer 900 is formed on the surface of the second substrate 200 where the metal layer 800 is formed and the surface of the metal layer 800 away from the second substrate 200. The insulating layer 900 insulates the surface of the metal layer 800 away from the second substrate 200 and the surface of the second substrate 200 where the metal layer 800 is formed.

It can be understood that, the operation that the light-shielding layer 600 and the planarization layer 700 are formed sequentially on the first substrate 100 to form the first substrate assembly 10 and the operation that the metal layer 800 and the insulating layer 900 are formed sequentially on the second substrate 200 to form the second substrate assembly 20 can be adjusted in order. Adjustment of process orders of the two operations does not affect manufacturing and generation of the display panel. For example, in implementations of the disclosure, the light-shielding layer 600 and the planarization layer 700 are formed sequentially on the first substrate 100 to form the first substrate assembly 10 at first. In other implementations, the metal layer 800 and the insulating layer 900 can be formed sequentially on the second substrate 200 to form the second substrate assembly 20 at first during manufacturing of the display panel. That is, the operation at S320 is performed at first, and then the operation at S310 is performed, which is not specifically limited herein.

S330, a sealing frame assembly 40 is manufactured between the first substrate assembly 10 and the second substrate assembly 20 to form the display panel 1000, where the sealing frame assembly 40 includes a first electrode 430, a sealing frame adhesive layer 410, and a second electrode 450 that are stacked sequentially. Particulate media 411 are disposed in the sealing frame adhesive layer 410. The particulate media 411 are deflected or expanded or contracted under action of different preset electrical fields defined between the first electrode 430 and the second electrode 450 to adjust a thickness of the sealing frame adhesive layer 410.

Referring to FIG. 13, FIG. 13 is a schematic flow chart illustrating an operation at S330 in a manufacturing method of a display panel disclosed in implementations of the disclosure. As illustrated in FIG. 13, the operation at S330 may include at least the following.

S331, the first electrode 430 and a first insulating sealing-frame-layer 470 are formed on a surface of the planarization layer 700 away from the light-shielding layer 600, where the first electrode 430 is disposed on an outer side surface of the first insulating sealing-frame-layer 470.

Figure 14:
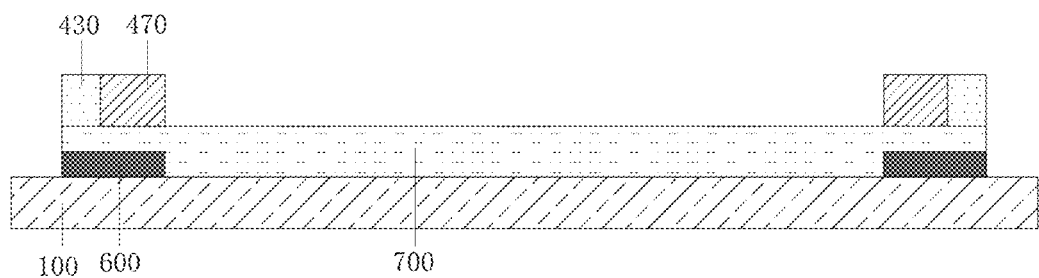
FIG. 14 is a schematic diagram illustrating a corresponding structure formed at S331 in a manufacturing method of a display panel disclosed in implementations of the disclosure.

Specifically, referring to FIG. 14, FIG. 14 is a schematic diagram illustrating a corresponding structure formed at S331 in a manufacturing method of a display panel disclosed in implementations of the disclosure. As illustrated in FIG. 14, the first electrode 430 is formed on the side surface of the planarization layer 700 away from the light-shielding layer 600 through the sputter-coating process, and the first insulating sealing-frame-layer 470 is formed on the surface of the planarization layer 700 away from the light-shielding layer 600 through the coat process. The first insulating sealing-frame-layer 470 is configured to insulate a surface of the first electrode 430 facing the first insulating sealing-frame-layer 470.

In implementations of the disclosure, the first electrode 430 and the first insulating sealing-frame-layer 470 correspond to the light-shielding layer 600 in position. That is, a side surface of the first electrode 430 away from the first insulating sealing-frame-layer 470 is flush with an outer side surface of the light-shielding layer 600, and a side surface of the first insulating sealing-frame-layer 470 away from the first electrode 430 is flush with an inner side surface of the light-shielding layer 600. A surface of the first electrode 430 away from the planarization layer 700 is flush with a surface of the first insulating sealing-frame-layer 470 away from the planarization layer 700.

It can be understood that, an order for forming the first electrode 430 and an order for forming the first insulating sealing-frame-layer 470 can be adjusted, and adjustment of process orders of the two operations does not affect manufacturing and generation of the display panel. For example, the first electrode 430 is formed at first in implementations of the disclosure, and the first insulating sealing-frame-layer 470 can be formed at first in other implementations, which is not specifically limited herein.

S332, the second electrode 450 and a second insulating sealing-frame-layer 490 are formed on a side surface of the insulating layer 900 away from the metal layer 800, where the second electrode 450 is disposed on an outer side surface of the second insulating sealing-frame-layer 490.

Figure 15:
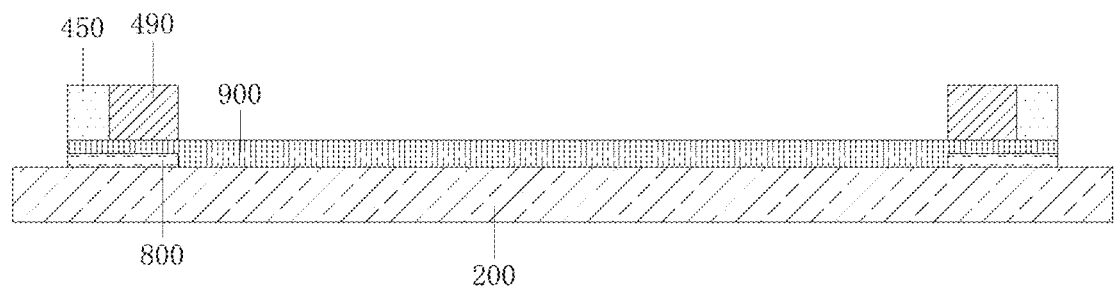
FIG. 15 is a schematic diagram illustrating a corresponding structure formed at S332 in a manufacturing method of a display panel disclosed in implementations of the disclosure.

Specifically, referring to FIG. 15, FIG. 15 is a schematic diagram illustrating a corresponding structure formed at S332 in a manufacturing method of a display panel disclosed in implementations of the disclosure. As illustrated in FIG. 15, the second electrode 450 is formed on the side surface of the insulating layer 900 away from the metal layer 800 through the sputter-coating process, and the second insulating sealing-frame-layer 490 is formed on the side surface of the insulating layer 900 away from the metal layer 800 through the coat process.

In implementations of the disclosure, the second electrode 450 and the second insulating sealing-frame-layer 490 correspond to the metal layer 800 in position. That is, a side surface of the second electrode 450 away from the second insulating sealing-frame-layer 490 is flush with an outer side surface of the metal layer 800, and a side surface of the second insulating sealing-frame-layer 490 away from the second electrode 450 is flush with an inner side surface of the metal layer 800. A surface of the second electrode 450 away from the insulating layer 900 is flush with a surface of the second insulating sealing-frame-layer 490 away from the insulating layer 900.

It can be understood that, an order for forming the second electrode 450 and an order for forming the second insulating sealing-frame-layer 490 can be adjusted, and adjustment of process orders of the two operations does not affect manufacturing and generation of the display panel. For example, the second electrode 450 is formed at first in implementations of the disclosure, and the second insulating sealing-frame-layer 490 can be formed at first in other implementations, which is not specifically limited herein.

It can be understood that, the operation that the first electrode 430 and the first insulating sealing-frame-layer 470 are formed on the surface of the planarization layer 700 away from the light-shielding layer 600 and the operation that the second electrode 450 and the second insulating sealing-frame-layer 490 are formed on the side surface of the insulating layer 900 away from the metal layer 800 can be adjusted in order. Adjustment of process orders of the two operations does not affect manufacturing and generation of the display panel. For example, in implementations of the disclosure, the first electrode 430 and the first insulating sealing-frame-layer 470 are formed on the surface of the planarization layer 700 away from the light-shielding layer 600 at first. In other implementations, the second electrode 450 and the second insulating sealing-frame-layer 490 can be formed on the side surface of the insulating layer 900 away from the metal layer 800 at first during manufacturing of the display panel. That is, the operation at S332 is performed at first, and then the operation at S331 is performed, which is not specifically limited herein.

S333, the sealing frame adhesive layer 410 is coated on a surface of the first electrode 430 away from the planarization layer 700 and/or a surface of the second electrode 450 away from the insulating layer 900, where the particulate media 411 are disposed in the sealing frame adhesive layer 410.

Specifically, the particulate media 411 are mixed in the sealing frame adhesive layer 410, and the particulate media 411 can be deflected or expanded or contracted under action of the electrical fields, thereby increasing or decreasing the thickness of the sealing frame adhesive layer 410.

In implementations of the disclosure, the particulate media 411 can consist of any one or more of polyvinylidene fluoride, lead meta-niobate, lithium galliate, lithium germanate, titanium germanate, iron-transistor lithium niobate, and iron-transistor lithium tantalate that have a mass ratio ranging from 1% to 10%.

S334, the first electrode 430 and the second electrode 450 are aligned and the first electrode 430 is bonded to the second electrode 450 with the sealing frame adhesive layer 410, to form the display panel 1000.

Specifically, referring to FIG. 1, a side of the first electrode 430 away from the first insulating sealing-frame-layer 470 is aligned with a side of the second electrode 450 away from the second insulating sealing-frame-layer 490 and the first electrode 430 is pressed to the second electrode 450, to form the display panel 1000.

It can be understood that, support members 310 are already formed between the first substrate assembly 10 and the second substrate assembly 20 before bonding the first electrode 430 to the second electrode 450.

Specifically, a thickness of the display region and a thickness of the non-display region are detected through a detection device after the display panel 1000 is formed. If the thickness of the display region is different from the thickness of the non-display region, the detection device is electrically coupled with the first electrode 430 and the second electrode 450, to define different preset electrical fields between the first electrode 430 and the second electrode 450. The particulate media 411 are deflected or expanded or contracted under action of the different preset electrical fields, to adjust the thickness of the sealing frame adhesive layer 410, thereby adjusting the thickness of the display panel 1000.

It can be understood that, the light-shielding layer 600, the metal layer 800, the first electrode 430, the first insulating sealing-frame-layer 470, the sealing frame adhesive layer 410, the second electrode 450, and the second insulating sealing-frame-layer 490 each are located in the non-display region of the display panel 1000, and the planarization layer 700 and the insulating layer 900 are located in both the display region and the non-display region of the display panel 1000.

S340, the sealing frame adhesive layer 410 is cured.

Specifically, the display panel is placed in a high-temperature curing oven, to cure the sealing frame adhesive layer 410.

It can be understood that, after performing the operation at S340, liquid crystal molecules 330 can be filled through vacuum suction-filling into multiple accommodation spaces that are defined among the first substrate assembly 10, the second substrate assembly 20, and the support members 310. Alternatively, when performing the operation at S334, the liquid crystal molecules 330 are evenly dropped on the first substrate assembly 10 or the second substrate assembly 20, and then the first electrode 430 is bonded to the second electrode 450 through the sealing frame adhesive layer 410. For illustration of similarities between the manufacturing method of the display panel and the display panel, reference can be made to the illustration of the display panel, which is not repeated herein.

To sum up, the manufacturing method of the display panel provided in implementations of the disclosure includes the following. The first substrate 100 is provided and the light-shielding layer 600 and the planarization layer 700 are formed sequentially on the first substrate 100, to form the first substrate assembly 10. The second substrate 200 is provided and the metal layer 800 and the insulating layer 900 are formed sequentially on the second substrate 200, to form the second substrate assembly 20. The sealing frame assembly 40 is manufactured between the first substrate assembly 10 and the second substrate assembly 20 to form the display panel 1000, where the sealing frame assembly 40 includes the first electrode 430, the sealing frame adhesive layer 410, and the second electrode 450 that are stacked sequentially. The particulate media 411 are disposed in the sealing frame adhesive layer 410. The particulate media 411 are deflected or expanded or contracted under action of the different preset electrical fields defined between the first electrode 430 and the second electrode 450 to adjust the thickness of the sealing frame adhesive layer 410. The sealing frame assembly 40 is configured to support the first substrate assembly 10 and the second substrate assembly 20, and the liquid crystal layer 30 is sealed between the first substrate assembly 10 and the second substrate assembly 20. Therefore, by disposing in the sealing frame adhesive layer 410 the particulate media 411 that can be deflected or expanded or contracted under action of the electrical fields, the thickness of the sealing frame adhesive layer 410 can be increased or decreased to match a height of each of the multiple support members 310 in the liquid crystal layer 30, thereby avoiding occurrence of display unevenness of the display panel 1000 and improving display quality of the display panel 1000.

The flow chart illustrated in the disclosure is merely an implementation, and there may be various modifications and changes of the steps in the figures or the disclosure without departing from the spirit of the disclosure. For example, the steps may be performed in different orders, or certain steps can be added, deleted, or modified. Those of ordinary skill in the field can understand and realize all or a part of the process of the above implementations, and the equivalent changes made in accordance with the claims of the disclosure still belong to the scope of the disclosure covered.

The reference term "an implementation", "some implementations", "an exemplary implementation", "an embodiment", "a specific embodiment", or "some embodiments" referred to herein means that a particular feature, structure, material, or characteristic described in conjunction with the implementations or embodiments may be contained in at least one implementation or embodiment of the disclosure.

The exemplary expressions of the above terms appearing in the specification does not necessarily refer to the same implementation or embodiment. Furthermore, the particular feature, structure, material, or characteristic described may be properly combined in any one or more implementations or embodiments.

It is to be understood that, the disclosure is not to be limited to be applied in the above implementations. Those of ordinary skill in the art can make improvements or changes based on the above illustration, and all these improvements and changes should fall within the protection scope of the appended claims of the disclosure. Those of ordinary skill in the field can understand and realize all or a part of the process of the above implementations, and the equivalent changes made in accordance with the claims of the disclosure still belong to the scope of the disclosure covered.

What is claimed is:

1. A display panel, comprising
a first substrate assembly,
a second substrate assembly,
a liquid crystal layer located between the first substrate assembly and the second substrate assembly, and
a sealing frame assembly located around a periphery of the liquid crystal layer,
wherein
the sealing frame assembly is disposed between the first substrate assembly and the second substrate assembly,
the sealing frame assembly comprises at least one first electrode, at least one second electrode, and a sealing frame adhesive layer located between the at least one first electrode and the at least one second electrode,
particulate media are disposed in the sealing frame adhesive layer,
the at least one first electrode is disposed at one side of the sealing frame adhesive layer facing the first substrate assembly,
the at least one second electrode is disposed at one side of the sealing frame adhesive layer facing the second substrate assembly,
the at least one first electrode and the at least one second electrode are used to define different preset electrical fields, and
the particulate media are deflected or expanded or contracted under action of the different preset electrical fields to adjust a thickness of the sealing frame adhesive layer, and
wherein
the sealing frame assembly comprises a plurality of first electrodes and a plurality of second electrodes, the plurality of first electrodes are arranged at intervals around the periphery of the liquid crystal layer, the plurality of second electrodes are arranged at intervals around the periphery of the liquid crystal layer, the sealing frame adhesive layer is located among the plurality of first electrodes and the plurality of second electrodes, and the liquid crystal layer is sealed between the first substrate assembly and the second substrate assembly; and the sealing frame assembly further comprises a first insulating sealing-frame-layer and a second insulating sealing-frame-layer, the first insulating sealing-frame-layer is disposed around the periphery of the liquid crystal layer and filled among the plurality of first electrodes to insulate the plurality of first electrodes from the liquid crystal layer, and the second insulating sealing-frame-layer is disposed around the periphery of the liquid crystal layer and filled among the plurality of second electrodes to insulate the plurality of second electrodes from the liquid crystal layer; or
the sealing frame assembly comprises one first electrode and one second electrode, the first electrode is disposed around the periphery of the liquid crystal layer, the second electrode is disposed around the periphery of the liquid crystal layer, the sealing frame adhesive layer is located between the first electrode and the second electrode, and the liquid crystal layer is sealed between the first substrate assembly and the second substrate assembly; and the sealing frame assembly further comprises a first insulating sealing-frame-layer and a second insulating sealing-frame-layer, the first insulating sealing-frame-layer is disposed at one side of the first electrode facing the liquid crystal layer to insulate the first electrode from the liquid crystal layer, and the second insulating sealing-frame-layer is disposed at one side of the second electrode facing the liquid crystal layer to insulate the second electrode from the liquid crystal layer.

2. The display panel of claim 1, wherein
the first substrate assembly comprises a planarization layer, a light-shielding layer, and a first substrate,
the planarization layer is disposed at one side of the liquid crystal layer away from the second substrate assembly and one side of the sealing frame assembly away from the second substrate assembly,
the planarization layer defines a first recess at a periphery of a surface away from the liquid crystal layer,
the light-shielding layer is embedded in the first recess,
the first substrate is disposed on the surface of the planarization layer away from the liquid crystal layer and a surface of the light-shielding layer away from the planarization layer, and
the planarization layer is configured to planarize a surface of the first substrate assembly facing the liquid crystal layer.

3. The display panel of claim 1, wherein
the second substrate assembly comprises an insulating layer, a metal layer, and a second substrate,
the insulating layer is disposed at one side of the liquid crystal layer away from the first substrate assembly and one side of the sealing frame assembly away from the first substrate assembly,
the insulating layer defines a second recess at a periphery of a surface away from the sealing frame assembly,
the metal layer is embedded in the second recess,
the second substrate is disposed on a surface of the insulating layer away from the liquid crystal layer and a surface of the metal layer away from the insulating layer,
the metal layer is electrically coupled with the second substrate to transmit an electrical signal to the second substrate, and
the insulating layer is configured to insulate the sealing frame assembly from the metal layer and insulate the liquid crystal layer from the second substrate.

4. The display panel of claim 1, wherein
the particulate media are piezoelectric material particles, and
the piezoelectric material particles are expanded or contracted under action of the different preset electrical fields to adjust the thickness of the sealing frame adhesive layer.

5. The display panel of claim 4, wherein the piezoelectric material particles are made of any one or more of polyvinylidene fluoride, lead meta-niobate, lithium galliate, lithium germanate, titanium germanate, iron-transistor lithium niobate, and iron-transistor lithium tantalate that have a mass ratio ranging from 1% to 10%.

6. The display panel of claim 1, wherein the particulate media are deflected under action of the different preset electrical fields to adjust an angle between each of length directions of the particulate media and each of directions of the different preset electrical fields, thereby changing the thickness of the sealing frame adhesive layer.

7. A display apparatus, comprising: a back-light module and a display panel, the display panel being located at a light-exiting side of the back-light module, and the back-light module being configured to provide lights for the display panel;

wherein the display panel comprises a first substrate assembly, a second substrate assembly, a liquid crystal layer located between the first substrate assembly and the second substrate assembly, and a sealing frame assembly located around a periphery of the liquid crystal layer;

wherein the sealing frame assembly is disposed between the first substrate assembly and the second substrate assembly, the sealing frame assembly comprises at least one first electrode, at least one second electrode, and a sealing frame adhesive layer located between the at least one first electrode and the at least one second electrode, particulate media are disposed in the sealing frame adhesive layer, the at least one first electrode is disposed at one side of the sealing frame adhesive layer facing the first substrate assembly, the at least one second electrode is disposed at one side of the sealing frame adhesive layer facing the second substrate assembly, the at least one first electrode and the at least one second electrode are used to define different preset electrical fields, and the particulate media are deflected or expanded or contracted under action of the different preset electrical fields to adjust a thickness of the sealing frame adhesive layer, wherein the sealing frame assembly comprises a plurality of first electrodes and a plurality of second electrodes, the plurality of first electrodes are arranged at intervals around the periphery of the liquid crystal layer, the plurality of second electrodes are arranged at intervals around the periphery of the liquid crystal layer, the sealing frame adhesive layer is located among the plurality of first electrodes and the plurality of second electrodes, and the liquid crystal layer is sealed between the first substrate assembly and the second substrate assembly; and the sealing frame assembly further comprises a first insulating sealing-frame-layer and a second insulating sealing-frame-layer, the first insulating sealing-frame-layer is disposed around the periphery of the liquid crystal layer and filled among the plurality of first electrodes to insulate the plurality of first electrodes from the liquid crystal layer, and the second insulating sealing-frame-layer is disposed around the periphery of the liquid crystal layer and filled among the plurality of second electrodes to insulate the plurality of second electrodes from the liquid crystal layer; or the sealing frame assembly comprises one first electrode and one second electrode, the first electrode is disposed around the periphery of the liquid crystal layer, the second electrode is disposed around the periphery of the liquid crystal layer, the sealing frame adhesive layer is located between the first electrode and the second electrode, and the liquid crystal layer is sealed between the first substrate assembly and the second substrate assembly; and the sealing frame assembly further comprises a first insulating sealing-frame-layer and a second insulating sealing-frame-layer, the first insulating sealing-frame-layer is disposed at one side of the first electrode facing the liquid crystal layer to insulate the first electrode from the liquid crystal layer, and the second insulating sealing-frame-layer is disposed at one side of the second electrode facing the liquid crystal layer to insulate the second electrode from the liquid crystal layer.

8. The display apparatus of claim 7, wherein the first substrate assembly comprises a planarization layer, a light-shielding layer, and a first substrate, the planarization layer is disposed at one side of the liquid crystal layer away from the second substrate assembly and one side of the sealing frame assembly away from the second substrate assembly, the planarization layer defines a first recess at a periphery of a surface away from the liquid crystal layer, the light-shielding layer is embedded in the first recess, the first substrate is disposed on the surface of the planarization layer away from the liquid crystal layer and a surface of the light-shielding layer away from the planarization layer, and the planarization layer is configured to planarize a surface of the first substrate assembly facing the liquid crystal layer.

9. The display apparatus of claim 7, wherein the second substrate assembly comprises an insulating layer, a metal layer, and a second substrate, the insulating layer is disposed at one side of the liquid crystal layer away from the first substrate assembly and one side of the sealing frame assembly away from the first substrate assembly, the insulating layer defines a second recess at a periphery of a surface away from the sealing frame assembly, the metal layer is embedded in the second recess, the second substrate is disposed on a surface of the insulating layer away from the liquid crystal layer and a surface of the metal layer away from the insulating layer, the metal layer is electrically coupled with the second substrate to transmit an electrical signal to the second substrate, and the insulating layer is configured to insulate the sealing frame assembly from the metal layer and insulate the liquid crystal layer from the second substrate.

10. The display apparatus of claim 7, wherein the particulate media are piezoelectric material particles, the piezoelectric material particles are expanded or contracted under action of the different preset electrical fields to adjust the thickness of the sealing frame adhesive layer.

11. A manufacturing method of a display panel, comprising:

providing a first substrate and forming a light-shielding layer and a planarization layer sequentially on the first substrate, to form a first substrate assembly;

providing a second substrate and forming a metal layer and an insulating layer sequentially on the second substrate, to form a second substrate assembly; and manufacturing a sealing frame assembly between the first substrate assembly and the second substrate assembly to form the display panel, wherein the sealing frame assembly comprises a first electrode, a sealing frame adhesive layer, and a second electrode that are stacked sequentially, particulate media are disposed in the sealing frame adhesive layer, and the particulate media are deflected or expanded or contracted under action of different preset electrical fields defined between the first electrode and the second electrode to adjust a thickness of the sealing frame adhesive layer;

wherein said manufacturing the sealing frame assembly between the first substrate assembly and the second substrate assembly to form the display panel, wherein the sealing frame assembly comprises the first electrode, the sealing frame adhesive layer, and the second electrode that are stacked sequentially, and the particulate media are disposed in the sealing frame adhesive layer, comprises:

forming the first electrode and a first insulating sealing-frame-layer on a surface of the planarization layer away from the light-shielding layer, wherein the first electrode is disposed on an outer side surface of the first insulating sealing-frame-layer;

forming the second electrode and a second insulating sealing-frame-layer on a side surface of the insulating layer away from the metal layer, wherein the second electrode is disposed on an outer side surface of the second insulating sealing-frame-layer;

forming the sealing frame adhesive layer on a surface of the first electrode away from the planarization layer and/or a surface of the second electrode away from the insulating layer, wherein the particulate media are disposed in the sealing frame adhesive layer; and aligning the first electrode and the second electrode and bonding the first electrode to the second electrode with the sealing frame adhesive layer, to form the display panel.

\* \* \* \* \*